United States Patent [19]
Solomon

[11] 3,982,331
[45] Sept. 28, 1976

[54] EDUCATIONAL BOARD GAME

[75] Inventor: Arieh Solomon, Tel-Aviv, Israel

[73] Assignee: OR-DA Industries Ltd., Rehovot, Israel

[22] Filed: Mar. 20, 1975

[21] Appl. No.: 560,543

[30] Foreign Application Priority Data
Mar. 20, 1974 Israel.................................. 44453

[52] U.S. Cl.......................... 35/31 D; 273/135 AA; 273/136 E
[51] Int. Cl.².................... G09B 19/02; A63F 3/00
[58] Field of Search................ 35/31 R, 31 B, 31 D, 35/31 F, 31 G, 35 H, 35 J, 69, 70, 71, 72, 73; 273/135 A, 135 AA, 136 E

[56] References Cited
UNITED STATES PATENTS

| | | | |
|---|---|---|---|
| 1,993,211 | 3/1935 | Dustin | 273/136 E X |
| 2,866,278 | 12/1958 | Snarr | 35/31 F |
| 2,871,581 | 2/1959 | Guzak | 35/31 D |
| 2,901,839 | 9/1959 | Huff | 35/70 |
| 3,131,488 | 5/1964 | Slater | 35/31 D |
| 3,381,394 | 5/1968 | Munro | 35/31 F |
| 3,414,986 | 12/1968 | Stassen | 35/31 D |
| 3,520,537 | 7/1970 | Peebles | 273/136 E X |

FOREIGN PATENTS OR APPLICATIONS 1,009,596  3/1952  France ...................... 273/135 AA Primary Examiner—William H. Grieb
Attorney, Agent, or Firm—Donald M. Sandler

[57] ABSTRACT

An educational board game comprising single and multiple unit tokens respectively, marked with numerals corresponding to the number of constituent units, each multiple unit token being formed of a corresponding multiple of integrally coupled together single unit tokens, and a board formed with successive series of discrete engagement locations, each token being engageable with a number (corresponding to the number of constituent units thereof) of successive locations, successive series of locations being separated from each other.

7 Claims, 6 Drawing Figures

U.S. Patent  Sept. 28, 1976  3,982,331
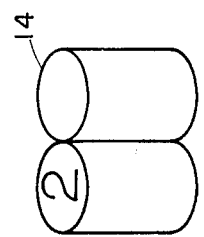
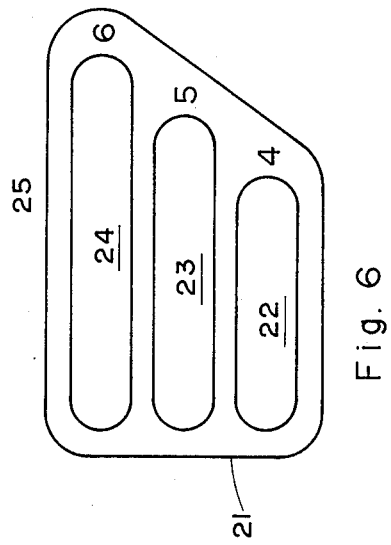
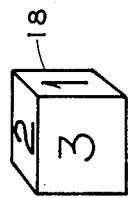
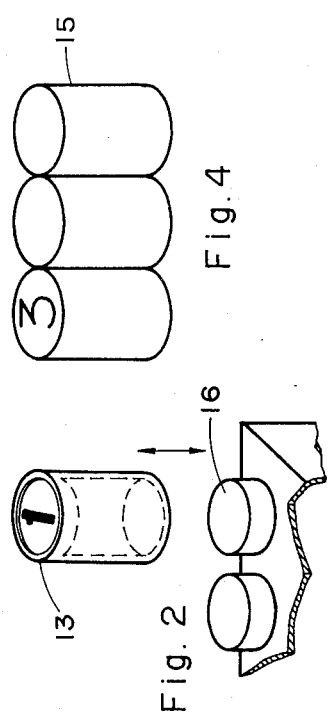
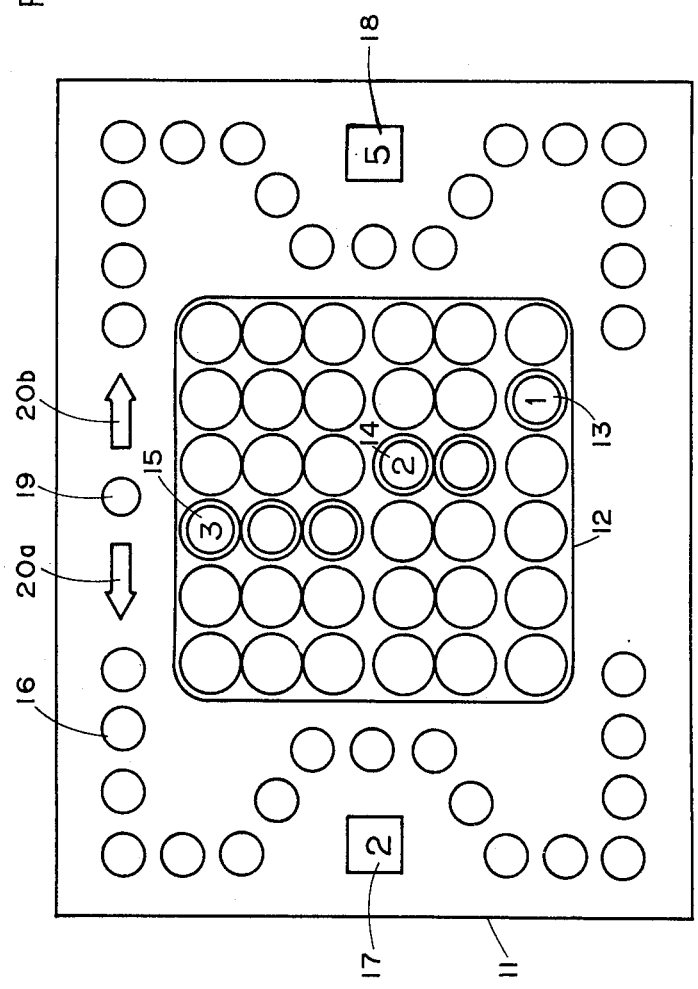

EDUCATIONAL BOARD GAME

This invention relates to an educational board game and has particularly as its object the provision of an educational board game capable of conveying to very young players such as for example the 3 to 6 year old age group some understanding of the concept of number and the ability to correlate the visual representation of a number with its physical embodiment.

According to the present invention there is provided an educational board game comprising single and multiple unit tokens respectively marked with numerals corresponding to the number of constituent units, each multiple unit token being formed of a corresponding multiple of integrally coupled together single unit tokens and a board formed with successive series of discrete engagement locations, each token being engageable with a number (corresponding to the number of constituent units thereof) of successive locations, successive series of locations being separated from each other.

Thus, the child in observing and examining the tokens learns the symbols representing numerals are associated with tokens of different sizes and in this way eventually learns to recognise that certain numerals are associated with certain sizes while other numerals are associated with other larger or smaller sizes.

If now and as is the case with the particular board game, the subject of this invention, play is initiated and proceeded with by the successive throwing of a dice the child learns to compare the numeral displayed by the dice with the various numerals displayed by the tokens and to choose the token bearing the appropriate numerals. Having done so educational play proceeds with the child either on his own or, competitively with another child attempting to fit the marker which he has chosen as corresponding to the numeral displayed by the dice on appropriate locations of the board this being effected randomly or in accordance with particular laws of the game. In this way and as these locations become restricted in number, the child learns to recognise a situation where the token in his hand is either bigger or smaller than the available location with which it is to be engaged.

Finally, and in accordance with a preferred embodiment of the present invention there is provided, for use with the game a summation tray comprising at least one elongated receiver in which can be fitted a plurality of tokens comprising a given number of unit tokens said receiver being identified by a numeral corresponding to said number. Thus, with such a summation tray and when, for example, a dice is used which bears numbers which are greater than the greatest number associated with the tokens the child can, by trial and error choose, from the available tokens, those which, when placed in the elongated receiver just fit therein, the combination of tokens thus chosen corresponding to the numeral which identifies the receiver and to the numeral displayed by the dice.

One embodiment of an educational board game in accordance with the present invention will now be described by way of example and with reference to the accompanying drawing in which:

FIG. 1 is a plan view from above of the board game and associated components,

FIG. 2 is a perspective view of a single unit token and a portion of the board,

FIGS. 3 and 4 are views of double and triple unit tokens,

FIG. 5 is a perspective view of one of the dice used with the board game, and

FIG. 6 is a plan view from above of a summation tray for use with the board game.

As seen in FIG. 1 of the drawings a rectangular board 11 is formed with a central rectangular recess 12 in which are stored single, double and triple unit tokens 13, 14 and 15. As seen in FIGS. 2 of the drawings the single unit token 13 comprises a hollow cylindrical shell open at its lower end and closed at its upper end and bearing at its upper end the numeral 1. The double unit token 14 consists of two such single unit tokens which are integrally coupled together at an adjoining directrix, the upper sealed ends of these units bearing the numeral 2. Similarly, the triple unit token consists of three of these single units bearing at its uppermost end the numeral 3.

On either side of the rectangular recess 12 are disposed successive series of stublike locations 16, the constituent numbers of each series being aligned, one series being separated from the successive series by virtue of a change of alignment.

The game is furthermore provided with two dice one, 17 bearing the numerals 1, 2, and 3 whilst the other 18 bearing the numerals 1 to 6.

The board is provided with a start indication 19 and a pair of direction arrows 20a and 20b.

A summation tray 21 for use in the game is shown in FIG. 6 of the drawings and comprises three successive elongated receiver recesses 22, 23 and 24 which are integrally coupled together by means of outwardly directed flanges 25, the receiver recess 22 being associated with the numeral 4, the receiver recess 23 being associated with the numeral 5 and the receiver recess 24 being associated with the numeral 6.

In the simpler stages of the game the child uses the dice 17 which only bears the numerals 1, 2 and 3 which can be directly compared with the similar numerals borne by the tokens 13, 14 and 15. Having thrown the dice 17 the child observes the numeral displayed thereby and proceeds to find a token on which is displayed a similar numeral. Having found such a token the child proceeds to try and fit this token on an appropriate set of stublike locations 16. The child can play by himself in which case he proceeds to choose tokens whose numerals correspond with the numerals displayed by the dice and progressively tries to fit the tokens chosen on the locations of the board. The child soon learns to realise that not each token which has been chosen can be fitted on the available series of locations. Thus the token concerned may comprise units which are less in number than the units available in the particular series of locations chosen by the child in which case the series is not completely covered by the token chosen. Alternatively, the series chosen may have a number of available locations less in number than the number of the constituent units of the token in which case that token cannot be placed in that series.

Alternatively, the tokens can be divided into two sets of respectively differing colours and two children can play competitively, one child proceeding in the direction of the arrow 20a whilst the other child proceeding in the direction of the arrow 20b. In a first relatively limited level of competitive play each child attempts to fit its tokens randomly on its own side of locations. In a more advanced level of play each child attempts to fit its chosen tokens successively along its sets of locations and should the child throw a dice whose number corresponds to a token which cannot be fitted on the remaining locations of the series, the child is penalized by losing a turn. In all cases the winner is the child who has successfully disposed the tokens on all the available locations.

With a higher level of play the dice 18 is employed and, seeing that this dice is capable of displaying numbers (the numerals 4, 5 and 6) which are not displayed by any of the available tokens the child will have to attempt to combine available tokens so as to produce the combination which is equivalent in size to the numeral displayed by the dice. For this purpose the summation tray 21 can be used. Thus if the dice displays the numeral 6 the child will pick out tokens and insert them into the receiver recess 24 in the tray 21 which he has identified as bearing the similar looking numeral 6 and, by trial and error, chooses those tokens which (unbeknown to him bear numerals which add up to 6) and which are of a length as to fit closely into the recess 24. The child will learn to choose that combination of tokens which not only fits into the appropriate recess in the tray but can then be used by him to fill the available locations in the board.

The use of the tray therefore teaches the child the idea of combining tokens bearing one set of numerals so as to produce a combination identified with another numeral.

The board game in accordance with the present invention therefore can provide a variety of opportunities to a young child in his preschool years for acquiring concepts of numerals, of numbers, of combinations and also of acquiring strategy in playing games associated with such numerals.

It will be appreciated that whilst the invention has been specifically described with reference to cylindrical tokens and stud-shaped projections other forms of tokens and engagement locations can be equally employed. Thus, the tokens can be solid and can be arranged to fit into appropriate recesses formed in the board.

Furthermore, whilst the successive series of locations in the board have been separated by changes of directions other means for effecting such separation can be employed such as for example suitable spacing between successive series.

I claim:
1. An educational board game comprising:
   a. a set of tokens, each of which consists of $n$ visually similar units where $n = 1, 2, \ldots$, each unit having board engaging means thereon, multiple units tokens for which $n>1$ being connected together along a longitudinal axis with their board engaging means facing in the same direction and uniformly spaced apart;
   b. a board having a plurality of spaced unit engaging means whose pitch is the same as the pitch of the board engaging means of the multiple unit tokens;
   c. the engaging means of the tokens and board being cooperable for mounting selected tokens to the board;
   d. said unit engaging means defining only a single path with at least one discontinuity at an intermediate location for preventing certain of the tokens from being mounted on the board with all of their board engaging means engaged with unit engaging means adjacent the discontinuity; and
   e. manually manipulatable means bearing numbers corresponding to $n$ for making a chance selection of one of the numbers thereby designating a token having the selected number of units for mounting on the board.

2. An educational board game according to claim 1 wherein the manually manipulatable means is a die having faces on which the numbers appear.

3. An educational board game according to claim 1 wherein the tokens are numbered, the number on a token being the sum of the number of units making up the token.

4. An educational board game according to claim 1 wherein at least two sets of unit engaging means are provided on the board.

5. An educational board game according to claim 4 wherein each of said two sets has at least two subsets that angularly intersect each other.

6. An educational board game according to claim 1 including a summation tray having receiver means for receiving a plurality of tokens, the sum of whose units is a predetermined number which identifies the receiver means.

7. A method for playing a game using a set of tokens, each of which consists of $n$ visually similar units, where $n = 1, 2, \ldots$, each unit having board engaging means thereon, and multiple unit tokens for which $n>1$ being connected together; a board having spaced unit engaging means defining only a single path with at least one discontinuity at an intermediate location, said unit engaging means being cooperable with the board engaging means for enabling the tokens to be mounted on the board and manipulatable means bearing numbers corresponding to $n$ for making a chance selection of one of the numbers; the method comprising the steps of:
   a. manipulating the manipulatable means for making a chance selection of a number;
   b. selecting from the set of tokens, one having the same number of units as the selected number; and
   c. mounting the selected token on the board only if each of its board engaging means can be engaged with unit engaging means on the board.

* * * * *